UNITED STATES PATENT OFFICE 2,521,068

ADDUCTS OF PARA-CHLOROBENZENE-SULFONYL HALIDES AND LOWER ALKYLENE ESTERS AND METHOD OF PREPARING THE SAME

Elbert C. Ladd, Passaic, N. J., assignor to United States Rubber Company, New York, N. Y., a corporation of New Jersey No Drawing. Application March 23, 1949, Serial No. 83,103

7 Claims. (Cl. 260—483)

This invention relates to a novel method of synthesizing compounds having the formula

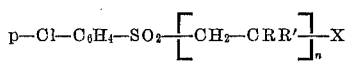

where X is halogen, $n$ is an integer equal to at least 1, R is hydrogen or alkyl, and R′ is an acyloxyalkyl group by the interaction of a p-chlorobenzenesulfonyl halide and an ester of an unsaturated aliphatic monohydric alcohol, especially allyl alcohol, with a fatty acid, especially a lower fatty acid, said ester having the general formula $CH_2=CRR'$ where R is hydrogen or an alkyl group and R′ is an acyloxyalkyl group, by heating a mixture of the reactants aforesaid in the presence of free radicals.

The reaction may be illustrated as follows:

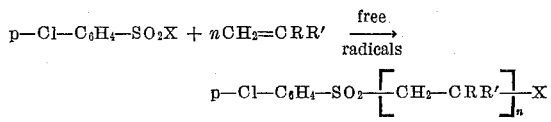

where X is halogen, preferably chlorine or bromine, $n$ is an integer of 1 or more, preferably an integer of from 1 to 5, R is hydrogen or alkyl and R′ is an acyloxyalkyl group, preferably a fatty acid acyloxymethyl group.

This invention results from my discovery of the unexpectedly high degree of reactivity of the p-chlorobenzenesulfonyl halides with the aforesaid esters under free radical conditions. Many other analogous aryl sulfonyl halides display only moderate reactivity, and yield chiefly polymeric products accompanied by only traces of the lower molecular weight products (i. e., products in which $n$ is 1 to 5 in the above formula). In contrast, I have made the unexpected discovery that in the reactions of my invention, the use of a p-chlorobenzenesulfonyl halide instead of the unsubstituted benzenesulfonyl halide leads readily to the formation of high yields of the lower molecular weight products, particularly those in which $n$ is from 1 to 5, which are commercially desirable.

When allyl acetate, $$CH_2=CH-CH_2-OCO-CH_3$$

is reacted with p—Cl—$C_6H_4$—$SO_2$—Cl in accordance with the present invention, the reaction products have the formula

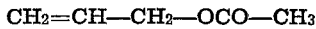

and typically contain a large proportion of the 1:1 adduct having the formula

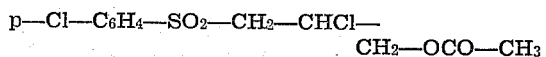

and the 2:1 adduct having the formula

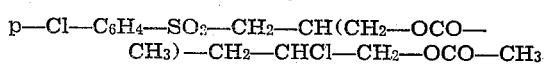

Any ester having the general formula $$CH_2=CRR'$$

where R is hydrogen or alkyl and R′ is an acyloxyalkyl group, i. e., any ester of an unsaturated aliphatic monohydric alcohol having a single terminal ethylenic group $CH_2=C<$ with a fatty acid, can be used in the practice of my invention. I especially prefer to use those esters wherein the acyloxyalkyl group is one in which the acyl group is derived from a lower fatty acid and wherein the alkyl group is lower alkyl.

Examples of esters which can be used in the practice of my invention include allyl acetate, allyl propionate, allyl butyrate, allyl valerate, allyl caproate, allyl caprylate, allyl caprate, allyl laurate, allyl stearate, etc., and the corresponding esters of methallyl alcohol, of methylvinyl carbinol (3-buten-2-ol), of allylcarbinol (3-buten-1-ol), of 4-penten-1-ol, etc. The lower fatty acid esters of allyl and methallyl alcohol, in which the acyloxyalkyl group is acyloxymethyl, are especially preferred because of their cheapness and availability.

The products of my invention are not only useful as plasticizers, flame retardant agents and lube-oil additives, but also possess enhanced utility in other applications, e. g., polymerization, by virtue of their ability to undergo various reactions including hydrolysis, dehydrohalogenation, sulfonation, and chlorination.

The reactions of my invention are carried out by heating at temperatures of 25°–300° C., usually at 60°–200° C., a mixture of the p-chlorobenzenesulfonyl halide and the ester in molar ratios of from 1:10 to 20:1, particularly from 1:1 to 15:1, in the presence of free radicals. The latter may be generated in the reaction mixture by the action of ultra-violet light or of from 0.1 to 10% by weight (based on the reactants) of a chemical which is capable of undergoing thermal decomposition to yield free radicals, including peroxidic compounds (e. g., an inorganic peroxide such as hydrogen peroxide, or an organic peroxide, such as benzoyl peroxide, acetyl peroxide and tertiary-butyl hydrogenperoxide), metal alkyls (e. g., sodium amyl, lead tetraethyl), and alpha,alpha'-azobis(alpha-alkyl-alkanoic) acids and derivatives hydrolyzable thereto such as alpha,alpha'-azobis(isobutyronitrile), alpha,alpha'-azobis(isobutyric acid), and alpha,alpha'-azobis(alpha-methylbutyronitrile). In some cases, superatmospheric pressures may be employed to hold the reactants in the liquid phase. Inert diluents, particularly hydrocarbons such as hexane, octane, cyclohexane, benzene, and toluene, can also be present. The reaction times vary somewhat with the reactants employed, but from 2 to 48 hours are generally adequate, and 2 to 24 hours often suffice.

The reaction products can be isolated and purified by preferential extraction, fractional distillation or crystallization.

The following example discloses my invention in more detail.

*Example*

A mixture of 105 grams of p-chlorobenzenesulfonyl chloride, 50 grams of allyl acetate and 5.0 grams of benzoyl peroxide is heated at 78° C. for 25 hours. The reacted mixture is evacuated to remove unreacted starting materials and the residue is subjected to molecular distillation. At a pressure below 1 micron and a pot-temperature of about 150°–170° C., 40.3 grams of the 1:1 adduct, p-chlorophenyl 3-acetoxy-2-chloropropyl sulfone, are obtained, $n_D^{20}$ 1.5471 (per cent chlorine=21.61 found, theory=22.8; per cent sulfur= 9.99 found, theory=10.3). The 53.7 grams of pot residue comprised mainly the 2:1 adduct, 5-acetoxy-2-(acetoxymethyl)-4-chloroamyl p-chlorophenyl sulfone (per cent sulfur=8.14 found, theory=7.79; per cent chlorine=15.12 found, theory=17.2).

From the foregoing it will be seen that the present invention provides a simple and convenient method of preparing a new class of valuable chemicals. The process of my invention is particularly characterized by its high flexibility which enables any compound in the class aforementioned to be prepared by selection of appropriate reactants and reaction conditions.

A very great advantage of the process of the present invention is that it yields predominantly or exclusively the lower adducts, i. e., those having from 1 to 5 mols of combined unsaturated ester per mol of combined p-chlorobenzenesulfonyl halide.

Having thus described my invention, what I claim and desire to protect by Letters Patent is:

1. The method of making compounds having the formula

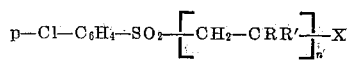

where X is selected from the group consisting of chlorine and bromine, n is an integer of from 1 to 5, R is selected from the group consisting of hydrogen and lower alkyl, and R' is a lower fatty acid acyloxyalkyl group in which the alkyl is lower alkyl, which comprises heating a mixture of a p-chlorobenzenesulfonyl halide in which the halogen to which the p-chlorobenzenesulfonyl group is attached is selected from the group consisting of chlorine and bromine and a compound having the formula CH$_2$=CRR', where R is selected from the group consisting of hydrogen and lower alkyl, and R' is a lower fatty acid acyloxyalkyl group in which the alkyl is lower alkyl, in the presence of free radicals, and recovering a compound having said formula from the resulting reaction mixture.

2. The method of making compounds having the formula

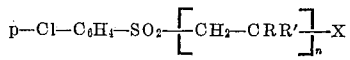

where X is selected from the group consisting of chlorine and bromine, n is an integer of from 1 to 5, R is selected from the group consisting of hydrogen and lower alkyl, and R' is an acyloxyalkyl group, which comprises heating a mixture of a p-chlorobenzenesulfonyl halide in which the halogen to which the p-chlorobenzenesulfonyl group is attached is selected from the group consisting of chlorine and bromine and a compound having the formula CH$_2$=CRR', where R is selected from the group consisting of hydrogen and lower alkyl, and R' is a lower fatty acid acyloxyalkyl group in which the alkyl is lower alkyl, in the presence of a compound which undergoes thermal decomposition at the reaction temperature and liberates free radicals, and recovering a compound having said formula from the resulting reaction mixture.

3. The method which comprises heating a mixture of a p-chlorobenzenesulfonyl halide and allyl acetate in the presence of free radicals and recovering an adduct of said p-chlorobenzenesulfonyl halide and allyl acetate from the resulting reaction mixture.

4. A chemical compound having the type formula

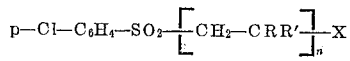

where X is selected from the group consisting of chlorine and bromine, n is an integer of from 1 to 5, R is selected from the group consisting of hydrogen and lower alkyl, and R' is a lower fatty acid acyloxyalkyl group in which the alkyl is lower alkyl.

5. A chemical compound having the formula

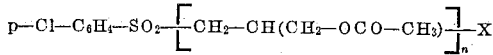

where X is selected from the group consisting of chlorine and bromine and n is an integer of from 1 to 5.

6. The chemical p-chlorophenyl 3-acetoxy-2-chloropropyl sulfone.

7. The chemical 5-acetoxy-2-(acetoxymethyl)-4-chloroamyl p-chlorophenyl sulfone.

ELBERT C. LADD.

No references cited.